Nov. 23, 1926.
R. F. BARKER
1,608,051
COMBINED SHOCK ABSORBER AND LOAD EQUALIZER
Filed Feb. 11, 1922    2 Sheets-Sheet 1
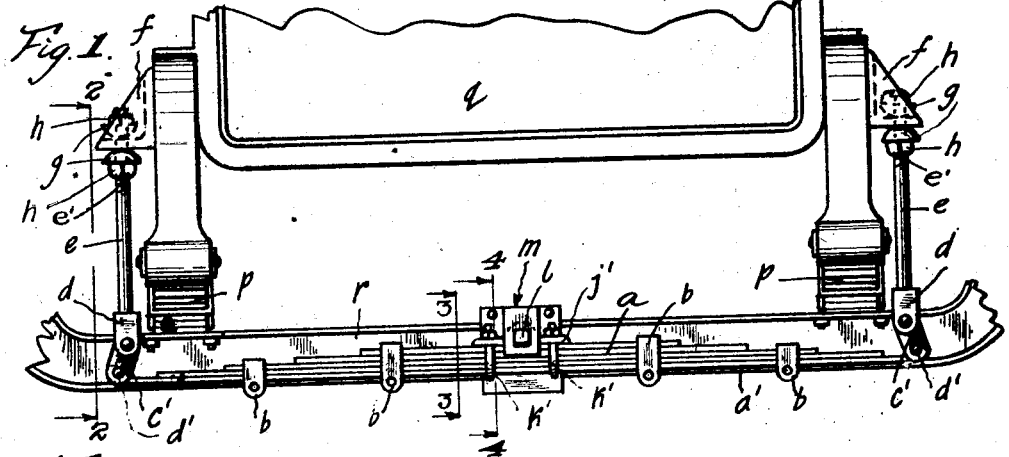
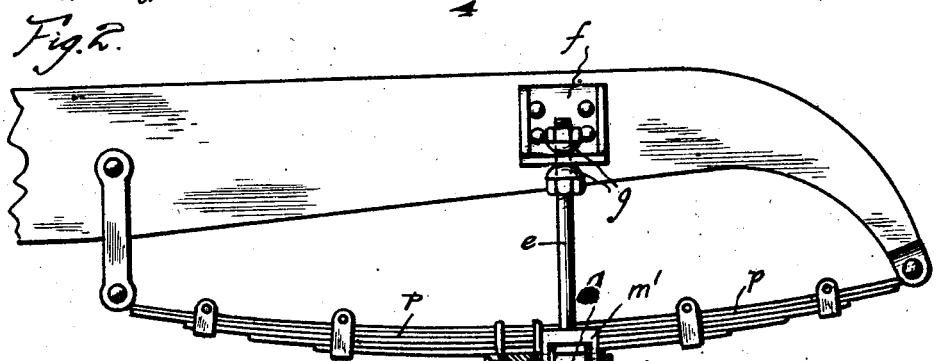
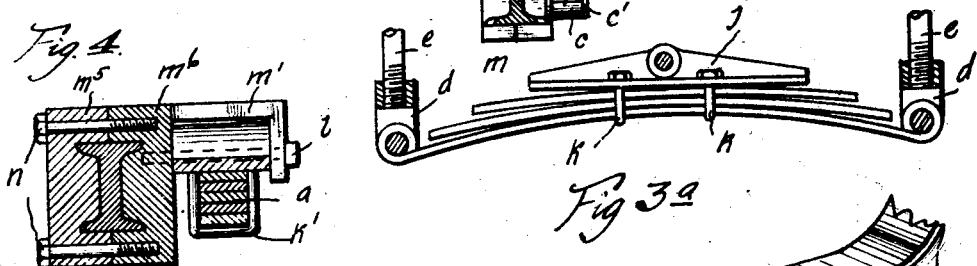
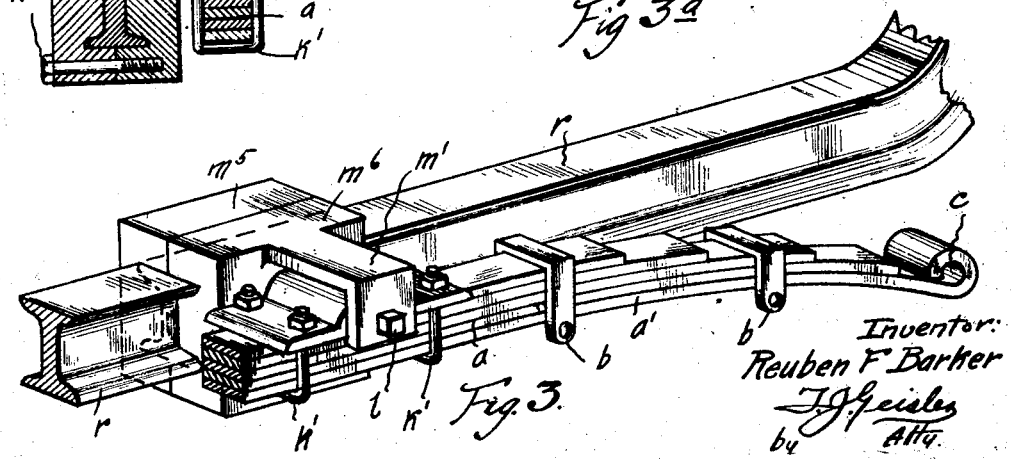
Inventor:
Reuben F Barker Nov. 23, 1926.   1,608,051
R. F. BARKER
COMBINED SHOCK ABSORBER AND LOAD EQUALIZER
Filed Feb. 11, 1922   2 Sheets-Sheet 2
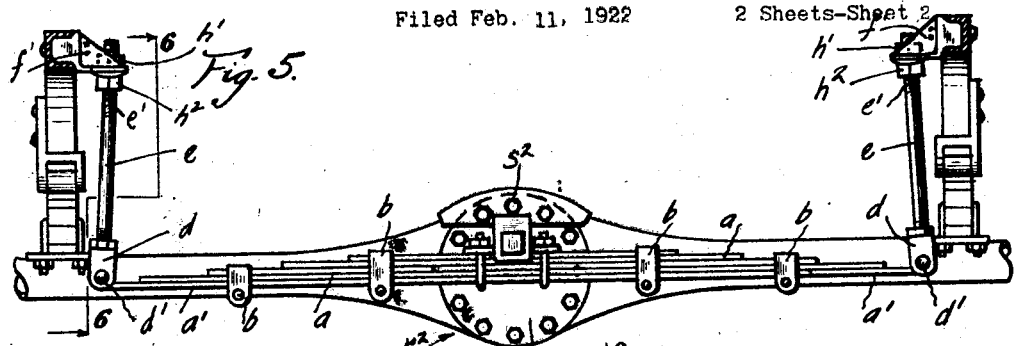
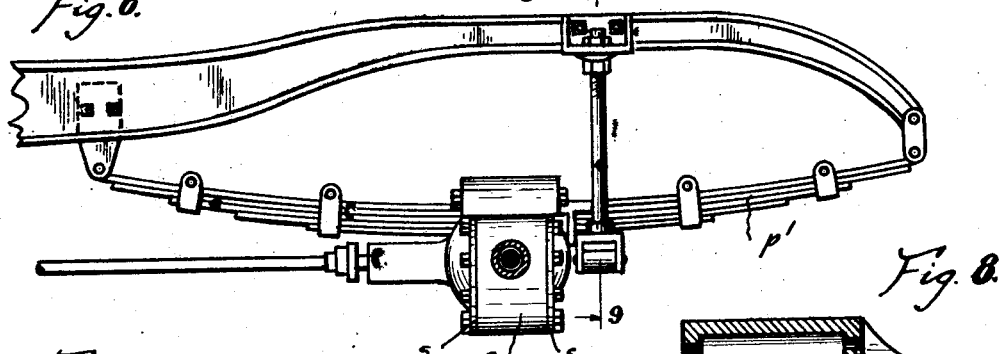
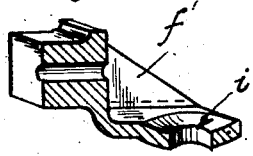
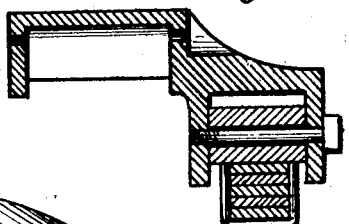
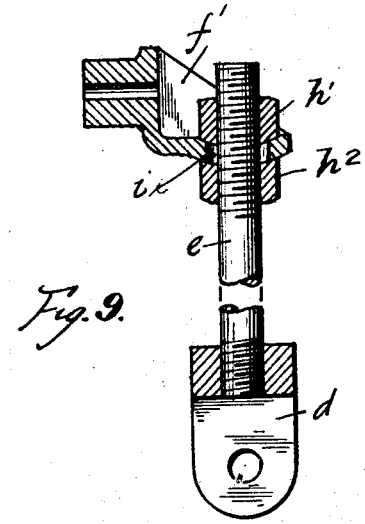
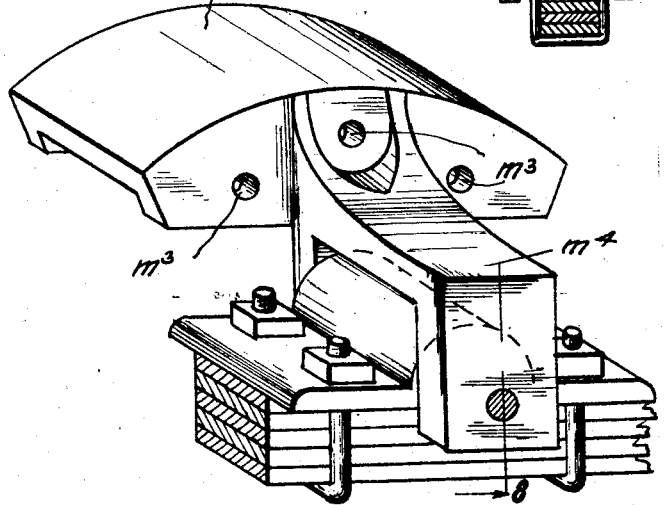
Inventor:
Reuben F Barker Patented Nov. 23, 1926.

1,608,051

UNITED STATES PATENT OFFICE.

REUBEN F. BARKER, OF PORTLAND, OREGON.

COMBINED SHOCK ABSORBER AND LOAD EQUALIZER.

Application filed February 11, 1922. Serial No. 535,806.

One of the main objects of my invention is to provide an efficient, simple combined shock absorber and load equalizing device. Heretofore shock absorbers have been so constructed that altho they prevented the sudden recoil of the springs which were flexed by any sudden jar, due to the vehicle running over inequalities in the road, they did not prevent the recoil effect from being transmitted directly to the body of the car. The body of the car was therefore subjected to vertical oscillation whenever the car ran over ruts in the road.

I minimize such vertical oscillation of the body by providing with respect to both front and rear axles and the load carrying springs, an auxiliary spring element arranged transversely to the load carrying springs and supported at its middle to the adjacent axle. The auxiliary spring is held in opposite compression to the load carrying spring but not in as great an amount as the latter. These auxiliary springs do not carry any of the load, and on the other hand increase the force exerted on the load carrying springs; thus they function to check the return flexure of the load carrying springs.

A further object is to provide means which will diminish the tendency of the vehicle body to cant or lean to one side when the wheels run over an irregular road surface.

A further object is to provide means which maintain compression in the load carrying springs thus eliminating the vertical play between the spring leaves in worn shackles, which is the cause of disagreeable rattling.

All these, and other beneficial results I attain in the devices illustrated in the accompanying drawings, in which:

Fig. 1 is a partial view of the front end of an automobile embodying my invention;

Fig. 2 is a fragmentary side view of the front end of the frame of an automobile and shows the relation of my invention to the front axle;

Fig. 3 is a fragmentary sectional perspective taken aproximately on the line 3—3 of Fig. 1;

Fig. 3ª is a view partly in section of a variation in construction of my auxiliary spring;

Fig. 4 is a cross sectional view taken on the line 4—4 of Fig. 1 and shows the construction of the bracket;

Fig. 5 is a partial view of the rear end of an automobile embodying my invention;

Fig. 6 is a partial elevation relating to, and taken on the line 6—6 of Fig. 5, and shows how the bracket is fastened to the differential housing;

Fig. 7 is a larger scaled perspective view of said bracket and illustrates the attachment of the spring thereto;

Fig. 8 is a sectional view taken on the plane of the line 8 of Fig. 7;

Fig. 9 is a cross sectional view taken on the line 9—9 of Fig. 6 and shows the universal connection of the support to the chassis; and Fig. 10 is a fragmentary perspective view of the clip which fastens the support to the chassis seat.

My devices are placed between both the front and rear springs of automobiles and are entirely separate from each other but function exactly alike and are different only in connections. All automobiles are built fundamentally the same, but are slightly different in construction and it might be necessary to devise new supports for each make of car.

In the accompanying drawings I have merely shown the preferable way in which these connections can be made. Figs 1 to 4 show my device between the front springs of the car and the other drawings show the rear assembly.

My combination preferably comprises an inverted semi-elliptic spring made up of spring leaves fastened together by clips $b$. The longest leaf $a'$ has its ends turned up to form loops $c$. Links $c'$ may be fastened to this loop by means of a pin $d'$. A yoke $d$ may be fastened to each of these links $c'$ or else may be fastened directly to the adjacent loop $c$. A rod $e$ is fastened to each yoke and is allowed a free universal movement, by means of semi-spherical washers $g$ placed on both sides of the brackets or supports $f$, and held in place by means of nuts $h$. The link $c'$ also allows movement in one direction. Said universal movement also may be obtained by the means shown in Figs. 5, 9 and 10 in which a declevity $i$ is formed in the brackets or supports $f'$ and the nuts $h'$ and $h^2$ are so formed that the rod will be held against vertical movement, but is allowed slight movement horizontally. The spring leaves of the spring *a* may be also connected as shown in Fig. 3ª, in which the middle of the leaves is held against the bar *j* by means of shackles, *k*, thus leaving the spring-leaves free at the ends. The spring assembly shown in Fig. 1 is connected by similar shackles *k'* connected to a short bar *j'*. The bar *j'* is mounted over a pin *l* which is held by means of the bracket *m* fastened to the axle. If this bracket is to be connected to the axle *r* directly it may be made in two pieces $m^5$ and $m^6$, as shown in Fig. 4, which are held together, and in position, by the bolts *n*. The bracket *m* has an overhanging arm *m'* by which the bolt *l* is held in position.

It is to be understood that this spring assembly does not carry any of the load of the car *q* but is merely auxiliary to and is held in tension against the compression of the load carrying springs. The front load carrying springs *p* and the rear springs *p'* carry the entire weight of the car, and the transverse auxiliary springs merely check the return flexure of the load carrying springs. The threads *e'* on the rods *e* allow for adjustable tension in the auxiliary spring.

As mentioned before, the assembly in the rear of the car is the same except for the connections. The bracket $m^2$ shown in Fig. 7 is adaptable to fit over the differential $r^2$ of a car which has side plates *s*. The holes $m^3$ will match with the holes $s^2$ in the plate. The overhanging arm $m^4$ is made integral with the bracket $m^2$ and supports the transverse spring in the rear of the car.

The object of shock absorbers is to prevent the rapid rebound due to a sudden flexure of the springs, and this I have accomplished by means of an auxiliary spring in inverted form, with respect to and held in opposite compression to, the load carrying springs but not to so great an amount. It follows that a sudden compression of the main springs would lessen the compression in this auxiliary spring and it would resume the position it would normally take if the compression were relaxed. When the flexure in the load carrying springs has reached its maximum amount and started its return, the auxiliary spring will resist this motion and will break the suddenness of the rebound. It will do this without pulling the car down because the auxiliary spring is pivoted and, as force follows the line of least resistance, it will pull the wheel into the rut and will permit the car to continue in the same vertical plane. Furthermore, because of this pivoted construction, when one wheel strikes a sudden bump the action of the pivoted member will cause a slight increase in compression in the load carrying spring opposite, which will give slightly. This causes the deflected wheel to be brought down to the ground immediately upon passing the obstacle and will tend to eliminate the movement of the body of the car during this deflection.

My device is connected by means of universal joints at all points to the frame, and thus does not retard or limit the flexibility of the car in the least and therefore allows an unhampered freedom of motion.

I claim:

1. In a vehicle the combination of a body, a transverse axle, a load carrying spring supporting the body on the axle, a transverse auxiliary spring pivotally connected at its middle to the axle and having its ends connected to the body, said auxiliary spring being held flexed to resist the recoil of said load carrying springs, whereby the jar received by the running gear on one side of the vehicle due to the wheels running over an irregular road surface will be minimized by being transmitted thru the medium of said transverse auxiliary spring to the other side of the vehicle.

2. In a vehicle the combination of a body, a transverse axle, a load carrying spring supporting the body on the axle, a transverse auxiliary spring pivotally connected at its middle to the axle and having its ends connected to the body, said auxiliary spring being held flexed to resist the recoil of said load carrying springs, adjustable means on said end connections for regulating the flexure of said auxiliary spring, whereby the jar received by the running gear on one side of the vehicle due to the wheels running over an irregular road surface will be minimized by being transmitted thru the medium of said transverse auxiliary spring to the other side of the vehicle.

3. In a vehicle the combination of side frames, parallel elliptic laminated load carrying springs supporting said side frames, an axle supporting said load carrying springs, an inverted auxiliary elliptical laminated spring pivotally connected at its middle on said axles, said auxiliary spring being arranged transverse to the load carrying spring and tensioned to oppose the recoil of the latter, whereby the jar received by the running gear on one side of the vehicle due to the wheels running over an irregular road surface is minimized by being transmitted thru the medium of said inverted auxiliary spring to the other side of the vehicle.

4. In a vehicle the combination of side frames, parallel elliptic laminated load carrying springs supporting said side frames, an axle supporting said load carrying springs, an inverted auxiliary elliptical laminated spring pivotally connected at its middle on said axles, said auxiliary spring being arranged transverse to the load carrying spring and tensioned to oppose the recoil of the latter, connections between the extremities of said auxiliary spring and said side frames, such connections being made with a rotatable joint which is adapted to accommodate the action of said auxiliary spring, whereby the jar received by the running gear on one side of the vehicle due to the wheels running over an irregular road surface is minimized by being transmitted thru the medium of said inverted auxiliary spring to the other side of the vehicle.

5. An attachment for vehicles having axles, a body, and load-carrying springs between the axles and the body, comprising an elongated inverted elliptical, laminated spring element at its middle adapted for pivotally fastening to one axle of the vehicle, means at each end of the elongated spring element adapted to be fastened to the vehicle body, the elongated spring element being adapted to be flexed by said connections so as to oppose reflex action of said load carrying springs.

6. In a vehicle having a body, a transverse axle and load carrying spring element fastened at each side of the middle of said axle and adapted to support the body yieldingly thereon, an elongated member pivotally connected at its middle to said axle and connected at its ends to said body, whereby when one end of said axle tends to be spaced from that side of the body and to expand the spring element at that side said transverse member tends to pull the other end of the axle relatively towards the body.

7. In a vehicle having a body, a transverse axle and load carrying spring element fastened at each side of the middle of said axle and adapted to support the body yieldingly thereon, a flexible elongated member pivotally connected at its middle to said axle and connected at its ends to said body, whereby when one end of said axle tends to be spaced from that side of the body and to expand the spring element at that side said transverse member tends to pull the other end of the axle relatively towards the body.

8. In a vehicle having a body, a transverse axle and load carrying spring element fastened at each side of the middle of said axle and adapted to support the body yieldingly thereon, a semi-elliptic spring pivotally connected at its middle to said axle and connected at its ends to said body, whereby when one end of said axle tends to be spaced from that side of the body and to expand the spring element at that side said semi-elliptic spring tends to pull the other end of the axle relatively towards the body.

9. In a vehicle having a body, a transverse axle and load carrying spring element fastened at each side of the middle of said axle and adapted to support the body yieldingly thereon, a semi-elliptic spring pivotally connected at its middle to said axle and connected at its ends to said body at a point outside of said spring element, whereby when one end of said axle tends to be spaced from that side of the body and to expand the spring element at that side said semi-elliptic spring tends to pull the other end of the axle relatively towards the body.

10. In a vehicle having a body, a transverse axle and load carrying spring element fastened at each side of the middle of said axle and adapted to support the body yieldingly thereon, a semi-elliptic spring arranged to be tensioned oppositely to said load carrying spring element, pivotally connected at its middle to said axle and connected at its ends to said body, whereby when one end of said axle tends to be spaced from that side of the body and to expand the spring element at that side said semi-elliptic spring tends to pull the other end of the axle relatively towards the body.

11. In a vehicle having a body, a transverse axle and load carrying spring element fastened at each side of the middle of said axle and adapted to support the body yieldingly thereon, a flexible elongated member arranged to be tensioned oppositely to said load carrying spring element, pivotally connected at its middle to said axle and connected at its ends to said body, whereby when one end of said axle tends to be spaced from that side of the body and to expand the spring element at that side said semi-elliptic spring tends to pull the other end of the axle relatively towards the body.

12. In a vehicle having a body, a transverse axle and load carrying spring element fastened at each side of the middle of said axle and adapted to support the body yieldingly thereon, a bracket fastened to said axle and having a pivotally connected element extending laterally therefrom, an elongated member pivotally connected at its middle to said bracket and connected at its ends to said body, whereby when one end of said axle tends to be spaced from that side of the body and to expand the spring element at that side said semi-elliptic spring tends to pull the other end of the axle relatively towards the body.

13. In a vehicle having a body, a transverse axle and load carrying spring element fastened at each side of the middle of said axle and adapted to support the body yieldingly thereon, a semi-elliptic spring pivotally connected at its middle to said axle and connected at its ends to said body, said end connections for said semi-elliptic spring comprising relatively flexible devices, whereby when one end of said axle tends to be spaced from that side of the body and to expand the spring element at that side said semi-elliptic spring tends to pull the other end of the axle relatively towards the body.

14. In a vehicle having a body, a transverse axle and load carrying spring element fastened at each side of the middle of said axle and adapted to support the body yieldingly thereon, an elongated member pivotally connected at its middle to said axle and connected at its ends to said body, said end connections for said transverse member comprising relatively flexible devices, whereby when one end of said axle tends to be spaced from that side of the body and to expand the spring element at that side said transverse member tends to pull the other end of the axle relatively towards the body.

15. In a vehicle having a body, a transverse axle and load carrying spring element fastened at each side of the middle of said axle and adapted to support the body yieldingly thereon, an elongated member pivotally connected at its middle to said axle and connected as ends to said body at a point outside of said spring element, whereby when one end of said axle tends to be spaced from that side of the body and to expand the spring element at that side said transverse member tends to pull the other end of the axle relatively towards the body.

REUBEN F. BARKER.